US009081627B1

(12) United States Patent
Blanding et al.

(10) Patent No.: US 9,081,627 B1
(45) Date of Patent: Jul. 14, 2015

(54) WORKLOAD MANAGEMENT WITH RESOURCE TRANSFER SEQUENCE PLANNED AS A FUNCTION OF RANKING OF RESOURCE ALLOCATIONS

(75) Inventors: William H. Blanding, Bow, NH (US); Daniel Edward Herington, Dallas, TX (US); Gregory D. Jordan, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1462 days.

(21) Appl. No.: 11/831,657

(22) Filed: Jul. 31, 2007

(51) Int. Cl.
*G06F 9/46* (2006.01)
*G06F 9/52* (2006.01)

(52) U.S. Cl.
CPC .................................. *G06F 9/52* (2013.01)

(58) Field of Classification Search
USPC ........................................................ 718/104
See application file for complete search history.

(56) References Cited

U.S. PATENT DOCUMENTS

| | | | |
|---|---|---|---|
| 6,842,899 B2 * | 1/2005 | Moody et al. ................. | 718/100 |
| 6,957,435 B2 | 10/2005 | Armstrong et al. | |
| 6,988,134 B2 | 1/2006 | Thorpe et al. | |
| 7,051,188 B1 * | 5/2006 | Kubala et al. .................. | 712/29 |
| 7,089,306 B2 | 8/2006 | Thorpe et al. | |
| 2007/0299980 A1 * | 12/2007 | Amini et al. .................. | 709/231 |

* cited by examiner

*Primary Examiner* — Li B Zhen
*Assistant Examiner* — Bradford Wheaton
(74) *Attorney, Agent, or Firm* — Clifton L. Anderson

(57) ABSTRACT

A computer system includes computing resources and workload containers to which the resources can be allocated. A workload manager plans 1) a reallocation of the computing resources among said containers, and 2) a transfer sequence for units of the computing resources to implement said reallocation. The transfer sequence is selected as a function of a ranking of resource allocations and/or delay-related costs in implementing the reallocation.

9 Claims, 4 Drawing Sheets

WORKLOAD MANAGEMENT WITH RESOURCE TRANSFER SEQUENCE PLANNED AS A FUNCTION OF RANKING OF RESOURCE ALLOCATIONS

BACKGROUND OF THE INVENTION

Workloads consist of computer-executable entities to which the assignment of hardware and software computing resources can be controlled. It is usual to consider workloads as executing in resource containers (e.g., compartments, partitions) to which computing resources may be allocated and assigned.

Herein, "computing resources" refers to quantifiable entities that can be assigned to partitions or other containers, wherein an assigned quantity has an effect on the function, performance, or cost associated with a workload running in that container. Examples of such resources include: processors, storage media, communication or I/O devices, computer software programs, environmental resources such as electrical power and cooling, and licenses for the use of such resources. Resources are commonly considered and manipulated as multiples of some minimum quantity or resource unit, which may be a natural consequence of the characteristics of the resource (e.g. individual processing units) or selected for reasons of convenience or performance (e.g. blocks of storage resource).

Workload management is performed upon a collection of workloads operating within a resource domain. A "resource domain" is a computing environment within which the operation of workloads can be monitored and, optionally, within which resources can be reassigned to control the resources available to each workload, e.g., as a function of parameters monitored during operation of the workloads. This reassignment may be accomplished by moving resources to the resource containers within which the workloads execute, or moving workloads to different resource containers.

Workload management software functions by monitoring operating parameters (e.g., resource utilization, response time, and queue length) associated with workloads, predicting the resources required to keep these operating parameters of each workload near user-specified targets, planning the allocation of resources to workloads based on these predictions and other resource management parameters and user-specified priorities, and then implementing the allocation plan by reassigning (i.e., transferring) resources to workloads or workloads to resources as appropriate to ensure that workloads receive the resources that have been allocated to them.

Reassignment of resources means the transfer of workloads or of computing resources from one resource container to another. Such reassignment may require variously: 1) transfers to be performed serially rather than in parallel; 2) synchronization of those environments; and/or 3) updating non-volatile data which ensures persistence of the assignment. As a result, resource assignment can be time consuming. The resulting delays in transferring resources from less deserving to more deserving workloads limit the effectiveness of workload management and the efficiency of datacenter operation Herein, related art is described to facilitate understanding of the invention. Related art labeled "prior art" is admitted prior art; related art not labeled "prior art" is not admitted prior art.

BRIEF DESCRIPTION OF THE DRAWINGS

The figures depict implementations/embodiments of the invention and not the invention itself.

DETAILED DESCRIPTION

Figure 1:
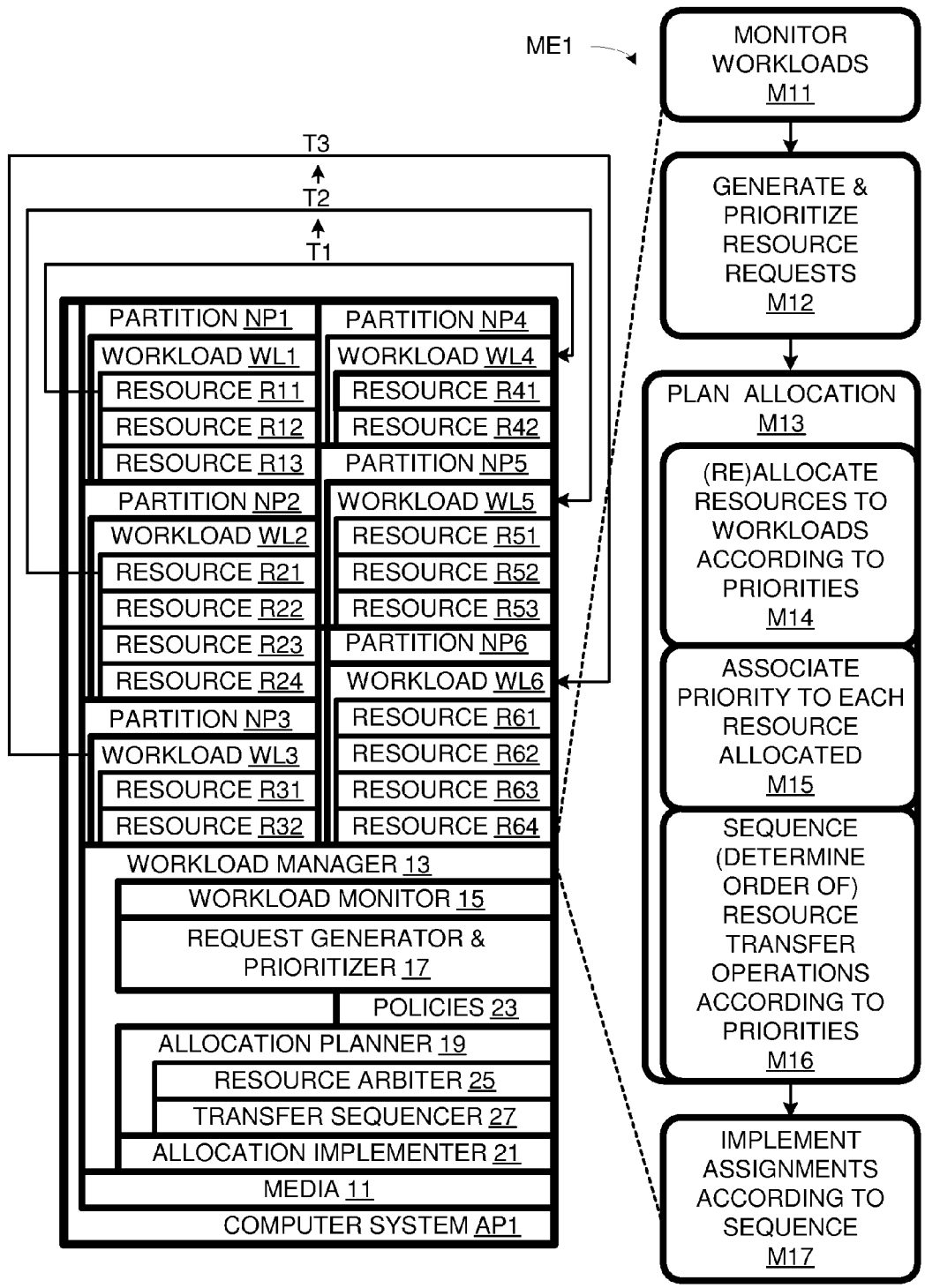
FIG. 1 is a combination schematic diagram and flow chart respectively of a computer system and a method in accordance with embodiments of the invention.

In the course of the present invention, it was recognized that the value associated with management of computing resources could be enhanced if the delay associated with transferring the most-needed resources [as identified by the allocation plan] was reduced, albeit at the expense of greater delays for less needed resources. It was further recognized that this approach could be realized by planning a transfer sequence, e.g., of de-assignment and reassignment operations, as a function of the request priorities used to plan the reallocation. Thus, the most important transfers, e.g., those transfers that are associated with the highest priority resource destinations, are performed first, and are thus the least burdened by delays associated with resource transfer.

Furthermore, reassignment can likewise be improved by selecting first for reassignment to satisfy said higher priority allocations those available resources that can be reassigned at the least cost. For example, the resource to be transferred can be selected as a function of how quickly it can be transferred. For another example, a resource to be transferred can be selected as a function of the cost associated with depriving its current owner of its use earlier rather than later in the transfer sequence.

Herein, a "workload resource management" involves planning and implementation phases. Planning involves determining an allocation (an amount of resources to be allocated to each workload or container), planning an assignment (a mapping of specific resources to specific workloads or containers), and planning a transfer sequence (indicating the order in which transfer operations are to be performed). The allocation, assignment, and transfer sequence can be planned sequentially or all at once. Implementing a transfer sequence inherently involves implementing an associated allocation and an associated assignment.

Once an allocation of resources has been determined, the planning of the actual resource transfers requires the selection of both the sources and destinations of those transfers. These source and destination workloads are readily identified by comparing the new allocation plan to the current resources of the individual workloads. Destination workloads are those whose new allocations exceed their current resources; resources need to be transferred to them from source workloads, whose current resources exceed their new allocation. The invention provides for planning resource transfers by repetitively selecting a workload as a resource transfer destination from the workloads requiring additional resources by considering the priorities associated with the workloads' resource requests as fulfilled by the allocation plan and then selecting a suitable resource transfer source from the workloads having excess resources by considering factors such as the time to accomplish the specific transfer [or other cost measure] as well as the priority which might be associated with the workloads' unfulfilled resource requests.

The invention provides for the association of resource allocation priorities with the increments of resources allocated to individual workloads and the subsequent use of those priorities in the planning of the reassignment of resources between workloads to match the allocation. Workload management resource allocation is a priority-driven process. Priorities may be expressed explicitly by being assigned to particular workloads or implicitly through some utility function computed from parameters associated with each workload and weights expressing the relative importance of those parameters and the workloads. This utility function is then to be minimized or maximized through the allocation of resources to workloads.

In the case of an explicitly priority-driven allocation, each workload typically has an explicit priority assigned to it that reflects the user's assessment of the importance of satisfying that workload's resource needs. In addition, the user specifies other resource management parameters for the workload (typically through a resource allocation policy), such as minimum, owned, and maximum resources, which have implicit priorities associated with them. (An "owned" resource amount is an amount of resources which is reserved specifically for the workload's use if needed, but is available on a temporary basis to other workloads when not needed by the owner.)

Allocation can be performed by constructing a list of resource requests for each workload or respective container, with a priority associated with each defining the relative importance of satisfying that request. An example of a resource request list in order of decreasing priority follows.

1) The minimum resource required for the resource container, to which the workload is assigned.

2) The minimum resource requested by the user for the workload, i.e., the "policy" minimum.

3) The whole or part of the predicted resource demand for the workload that is less than or equal to a user-specified "owned" amount. This is called the "owned" request.

4) The part of the predicted demand that is greater than the user-specified owned amount but not exceeding the user-specified maximum. This is called the "borrow" amount. This item only applies to workloads for which the predicted amount exceeds the owned amount.

5) The part of the owned amount that is greater than the predicted amount. This item only applies to workloads for which the owned amount is greater than the predicted amount.

6) The maximum resource requested by the user for the workload, i.e., the policy maximum.

7) The maximum resource that may be assigned to the workload's resource container.

Allocation is thus accomplished by distributing the available resources across these requests from the workloads in accordance with the associated priorities. That is, for example, resources are allocated first to satisfy the resource container minima of all workloads, then the policy minima, the owned requests, the borrow requests, etc. Once the borrow requests are satisfied, the remainder of the allocation amounts to distributing the excess resource, first to give each workload its full owned amount, and then, if resource remains, to try to fulfill policy maxima. In this process, resources are distributed within the constraints, if any, imposed by the hierarchy (i.e. the structure and interrelationships of the containers) of the domain.

Since resources are allocated to workloads in order of the priority of their resource requests, a priority can be associated with each unit of resource as it is allocated to a workload. Knowledge of the priority associated with each unit of resource allocated to each workload can then be used to plan the transfer of resources between containers so as to preferentially transfer resources more quickly to containers having higher priority allocations that are not satisfied by resources already available in the container.

For example, in the embodiment of FIG. 1, a computer system AP1 includes hardware divided into six partitions NP1-NP6 and computer-readable media 11. Computer-readable media 11 stores data and computer-executable programs, including workloads WL1-WL6 and a workload manager 13, which includes components distributed among partitions NP1-NP6. Computer resources, including R11-R13, R21-R24, R31-R32, R41-R42, R51-R53, and R61-R64 are initially distributed among partitions NP1-NP6, e.g., as shown in FIG. 1.

Workload manager 13 includes a workload monitor 15, a request generator 17, an allocation planner 19, an allocation implementer 21, and management policies 23. Allocation planner 19 includes a resource arbiter 25 and a transfer sequencer 27.

Workload manager 13 implements a method ME1, flow charted in FIG. 1. At method segment M11, workload monitor 15 monitors parameters, e.g., utilization and load, that can affect resource allocation for workloads WL1-WL6. Workload monitor 15 can store data so that, in addition to recent values, historical patterns and trends can be taken into account when allocating resources.

At method segment M12, request generator and prioritizer 17 generates requests, assigning a priority to each request. Priorities are assigned within the seven priority categories discussed above in accordance with management policies 23. Some requests (e.g., for owned and borrowed amounts) are based on data obtained by workload monitor 15, while others (e.g., container minima and maxima) arise from domain or container characteristics or from specified constraints. It will be appreciated that the invention does not rely upon any specific scheme for the assignment of priorities, so long as an ordering or ranking may be determined among the units of resource allocated to each workloads and between the units of resource allocated to different workloads.

At method segment M13, allocation planner 19 plans an allocation of resources to containers, e.g., partitions NP1-NP6, and thus to workloads WL1-WL6. At a method subsegment M14, resource arbiter 25 determines what resource amounts are to be allocated to which containers. At method subsegment M15, resource arbiter 25 generates a priority-tagged list of resources allocated to each container. At method subsegment M16, transfer sequencer 27 determines the ordering of transfer operations involved in implementing the allocation.

If resources are to be moved between resource containers, "transfer operations" refers to operations involved in removing a resource from a container and/or adding a resource to a container. Transfer operations can involve: 1) directly reassigning a resource from a source container to a destination container; 2) deactivating and/or deassigning a resource from a source container so that it can be transferred to a destination container; 3) reassigning a deactivated resource from a source container to a destination container;

4) assigning a resource to and/or activating a resource in a destination container. Note that 2-4 above can be part of a series of operations in which a first resource in a first container is deactivated so that a second resource can be added to a destination container. Alternatively, if workloads are to be moved between containers, "transfer operations" refers to operations involved in moving a workload from a source to a destination container and/or starting a new workload instance in a destination container before (optionally) stopping it in a source container.

Method segment M15 involves assigning priorities to each unit of resource allocated. The priority assigned to the request satisfied by a resource is now attributed to the units of resource used to satisfy that request. For example, resource R11 can be assigned the priority of the request that caused it to be allocated to workload WL4.

Method subsegment M16 takes the priorities assigned by request generator 17 and subsequently associated with resource unit allocations to containers by resource arbiter 25 into account in determining the order in which resources are to be transferred to workloads whose new allocations exceed their current resources. While several refinements are discussed below, the general idea is to fulfill higher priority needs before lower priority needs. Thus, high priority needs are addressed earlier on average than they would be if the implementation proceeded on an arbitrary or at least need-blind basis. For example, the workload and associated resource container most in need of additional processing power can be the first to receive an additional processor. Once the destination for each transfer is selected, then the source of the transfer is selected from those workloads whose current resources exceed their new allocations. It should be noted that the allocation process need not be serial, i.e., one-at-a-time; the requirement is that some workloads receive additional resources before others. Once both the assignment of resources to workloads and the order in which resources are to be transferred is determined, the allocation is implemented in the planned order at method segment M17.

Note that a resource domain may be flat or hierarchical. In a flat domain, all of the workloads have equal access to all of the resources in the domain. In a hierarchical domain, groups of workloads have equal access to the resources of subdivisions of the whole domain, and there are limitations to the transfers of resources that can be made between the subdomains. Such a domain is considered hierarchical because its structure may be expressed as a tree of resource containers. The root of the tree is a container that encompasses the entire domain. The root in turn contains a set of sub-containers (its children) that in turn contain sub-containers. Each container contains either more finely divided sub-containers or an individual workload. The resources of any container may be accessed equally by its child containers. However, resources of less closely related containers may be only accessed with limitations depending upon the configuration of the containers in the hierarchy.

Figure 2:
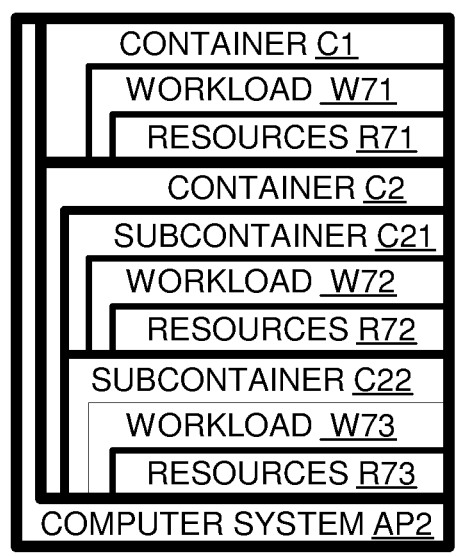
FIG. 2 is a block diagram of another computer system in accordance with an embodiment of the invention.

Thus, a computer system AP2, shown in FIG. 2, which itself can be considered a top-level resource domain and container, has two resource containers C1 and C2. Resource container C1 has a workload W71 with resources R71 assigned. Resource container C2 is divided into two subcontainers C21 and C22, with respective workloads W72 and W73 and respective resources R72 and R73. In the event of a hierarchical resource domain, an assignment of a resource to the lowest level container for a workload has the effect of also assigning that resource to all containers in the hierarchy that are "ancestors" of the workload's immediate container.

As a result, in the course of resource allocation, a list of resources and priorities can be constructed for each resource container containing a workload and each resource container containing other containers. Specifically the list for each container will have an entry for each unit of resource allocated to that container and the allocation priority at which that resource unit was allocated. Each container's list will be in priority order. That is, the initial entries on the list will be for the high priority resource requests of the workload consuming the container's resources, while subsequent entries will be for lesser priorities.

Figure 3:
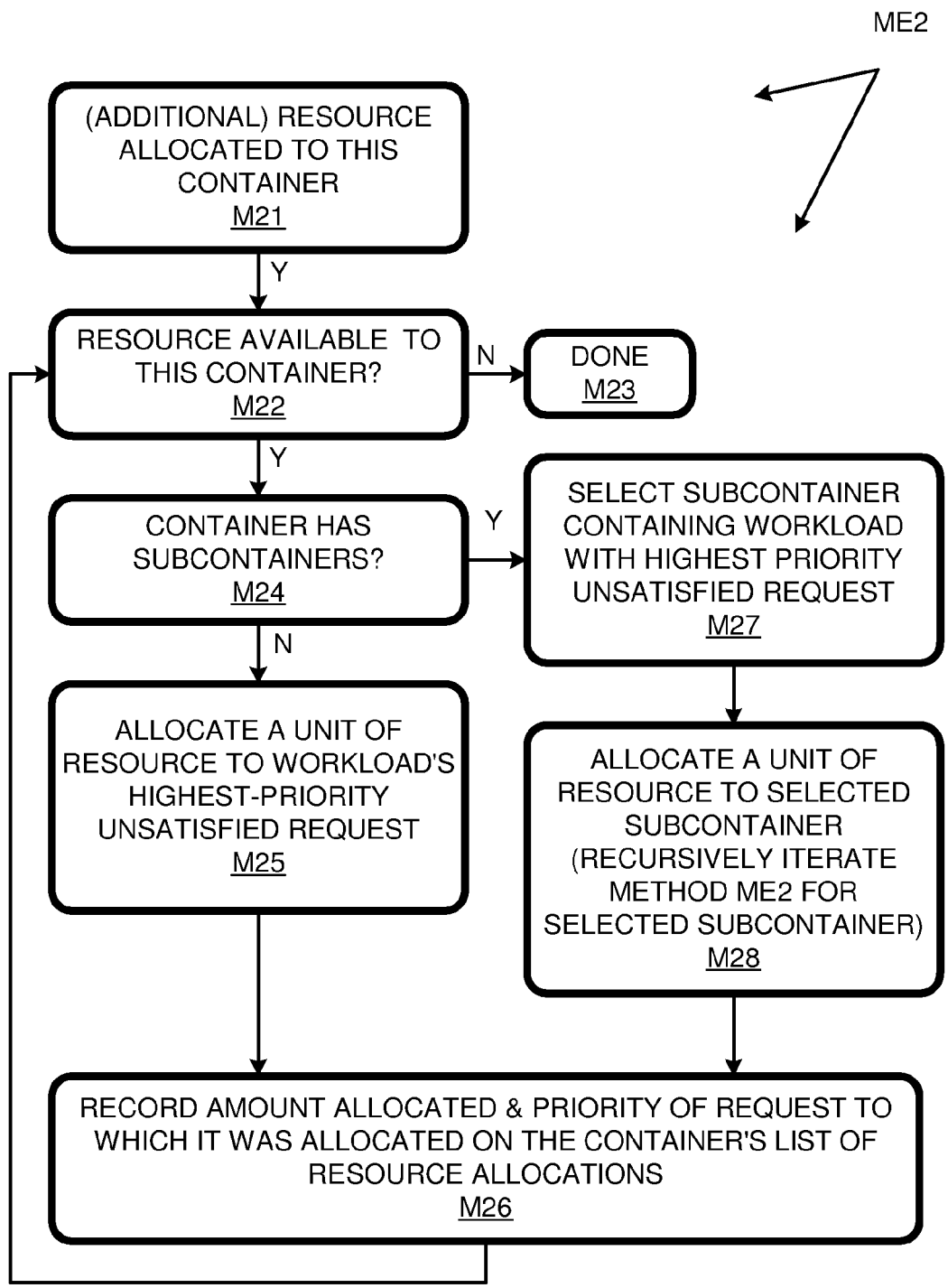
FIG. 3 is a flow chart of a method for managing workloads on a computer system with hierarchically arranged containers in accordance with an embodiment of the invention.

For example, a method ME2, flow-charted in FIG. 3, begins with the allocation of a resource to a ("this") container at method segment M21. Method segment M22 determines whether such a resource is available. If not, method ME2 is done at method segment M23. If the allocated resource is available, method ME2 proceeds with method segment M24.

As noted above, containers can be hierarchical. Method segment M24 determines whether or not a container includes subcontainers. If it does not, i.e., the container is at the base of the hierarchy, then a resource unit is allocated to the container's or workload's highest-priority unsatisfied request at method segment M25. At method segment M26, the amount allocated and the priority of the request according to which it was allocated are recorded on the container's list of resource allocations.

If, at method segment M24, it is determined that "this" container includes subcontainers, method ME2 proceeds to method segment M27. Method segment M27 calls for selecting the subcontainer containing the workload with the highest-priority unsatisfied request. Subsegment M28 involves allocating a unit of resource to the selected subcontainer. While shown as a single element, method segment M28 involves a recursive iteration of method ME2 (as though method segment M28 called method ME2 as a subroutine). One level of recursion is required for each level of the container hierarchy.

Once a unit of resource is allocated to a subcontainer, the amount allocated and the priority of the request according to which the allocation was made are recorded in the parent container's list of resource allocations. (The subcontainer's list will be updated during the recursive iteration of method segment M25 or method segment M28.) Whether method segment M26 is arrived at from method segment M25 or from method segment M28, method ME2 returns to method segment M23 to determine whether another unit of resource should be allocated to "this" container.

Figure 4:
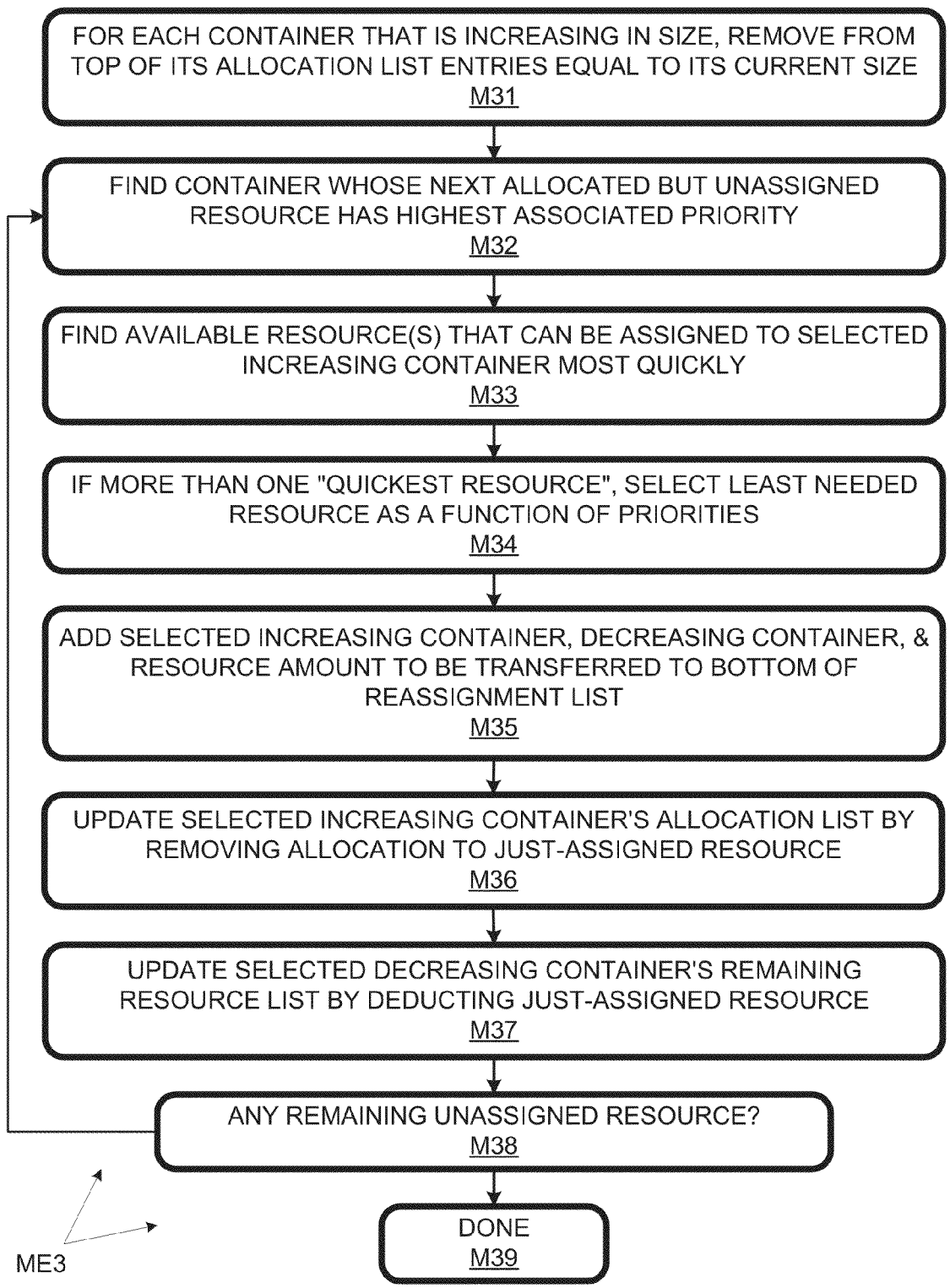
FIG. 4 is a flow chart of a method of determining the assignment of specific resources to the containers of a computer system in accordance with an embodiment of the invention.

In an alternative embodiment, a container's list of priorities associated with individual resource units allocated is extended to reflect priorities associated with unfulfilled requests. In some cases, resources are decreased because they are not needed, while in other cases, needed resources are lost because of competition from other workloads. This alternate embodiment allows losses from needy containers to be delayed relative to containers with unneeded or less needed resources. This tactic is revisited further below with reference to FIG. 4.

Once constructed during allocation, these resource priority lists can be used to order resource transfer operations. This is accomplished by the method ME3, flow-charted in FIG. 4. At method segment M31, for each container that is increasing in size, entries whose total resource is equivalent to the amount of resource already assigned to the container are removed from the top of its priority list. That is, the highest priority allocations to the container are assumed to be satisfied by resources already assigned to the container. The updated top of its priority list will now reflect the priority of the first additional resource unit that is to be assigned to it.

Method segment M32 involves scanning the containers that are increasing in size and selecting the container with the highest priority remaining on its priority list. In the event of a hierarchical domain, this scan would be performed from the root of the tree down to its children and then to their children and so on. Since all of the entries in a child's priority list also appear in the parent's list, parents will be selected for reassignment of additional resources prior to their children, which is necessary since the parent container provides the source of the resource, which is further reassigned to the children once the reassignment to the parent has been planned. The container so selected has the highest priority need for additional resource and should be the immediate recipient of resource reassignment.

This procedure can be used to generate an ordered list of all of the resource reassignments to be made, or equivalently to identify, one at a time, the next container to receive an additional amount of resource. Note that, to avoid inefficiency, where possible, all of a container's list entries at the same priority should be combined into a single reassignment. Furthermore, depending upon the characteristics of the actual reassignment process, it may be desirable to aggregate different priorities for the same container—that is, in effect, to order the reassignment of all resources to containers based upon the priority of the first amount of resource that is to be reassigned to a container. The reassignment list serves as a recommendation to the allocation implementer. The allocation implementer may choose to perform only a few of the highest priority reassignments, or the highest priority transfers that can be accomplished in a given length of time before the allocation is performed. Alternatively, the allocation implementer may be able to reorder the list in such a manner as to benefit some workloads without disadvantaging any others.

Method segment M33 involves finding available resources that can be assigned to the selected increasing container most quickly. The allocation resource reassignment requires that resources be removed (typically in a separate step) from containers to which they were previously assigned in order to be reassigned to other containers. This removal step can be accomplished all at once (i.e., prior to any resource increases being made) or a bit at a time as resources are needed for increases. In either case, the aforesaid list serves to define the order in which containers should be increased in size. If resources become unavailable as a result of errors in reassignment operations, the same ordering can be used to insure that to the extent permitted by the structure of the domain, the workloads/containers deprived of resources as a result of these errors are those with the least need.

Factors in addition to quickness can be considered in selecting a source for a resource. For example, some resource transfers may incur licensing fees, impose processing interruptions, or consume bandwidth more than others. Such factors may be used to select among resources sources that can be provided equally quickly. Alternatively, these factors can be weighed against quickness so that, in some cases, a resource that may be transferred less quickly may be selected over the resource that can be transferred the quickest (but at a higher cost according to some other factor or factors).

Thus, the "cost" associated with depriving a source destination of a resource can be a factor in determining which resources to transfer first. In this regard, up to this point, the described method assumes that the resources to be removed are all of equal priority; in other words, resources may be removed arbitrarily from any container that is "donating" resources by getting smaller. This is reasonable, since the allocation process normally finishes when all resources are allocated, thus no priorities are associated with the resources to be removed from a donating container.

As an enhancement to the above, the allocation process can continued to assign priorities to requests even after all available resources have been allocated. This has the effect of assigning priorities to the resources that are to be given up by the donating containers. This expanded priority information can be used to order the selection of the donating containers. As a result, resources would be removed first from containers that could most afford to lose them, while the removal of resources from containers which can least afford to lose them is postponed. Thus, method segment M34 involves selecting among equally quickest available resources those whose loss is least costly.

More generally, various means may be employed to predict the time or other cost of reassignment. The time or other cost of reassignment can be expressed as static data defining the time or other cost to move resources between the various types of containers which are available to be managed. This data may be supplemented by recording the actual time/costs of moving resources between the resource containers in a domain and adaptively tracking the actual time or other measure of cost. In any case, the time or cost of reassignment is incorporated into the determination of reassignment ordering by selecting the fastest or least-cost resource available for assignment to the current highest-priority container.

At method segment M35, transfer data including the source-decreasing container, the destination-increasing container, and the amount transferred, is added to the bottom of the reassignment list. At method segment M36, the selected increasing container's list is updated by removing the allocation associated with the resource that was just assigned. At method segment M37, the selected decreasing container list is revised by removing the resource that has just been assigned.

At method segment M38, a determination is made whether or not there are any remaining unassigned resources. If not, method ME3 stops at method segment M39. Otherwise, method ME3 iterates by returning to method segment M32 for the next highest priority allocation unit.

The net effect of this procedure is to first reassign resources in accordance with the highest priority resource requirements of each workload, and then in accordance with the next highest priority resource requirements of each workload, and so on. By this means, the order of resources assigned to each workload will reflect the priorities in the resource allocations for the workloads. As a result, the highest priority allocations for which containers/workloads do not already have resources are those to which resources are reassigned with the least delay. This result is not achieved by assignment methods that select the order of reassignment without regard to priority and cost of reassignment.

The present invention can apply to systems with any number of containers or workloads among which resources can be allocated. The resources can be processors, storage media, and communications devices. Resources or workloads may be considered for reassignment amongst resource containers. Each category can be considered separately, and types within each category (e.g., network interfaces versus disk interfaces, disk-based storage versus main memory) can be considered separately. However, in some embodiments, resource types are considered in combination, e.g., delay in the reassignment of processors can affect the delay in the reassignment of main memory that should be allowed. The invention involves the planning of resource and/or workload reassignment or transfer; performing the actual transfer is an optional step. These and other variations upon and modifications to the illustrated embodiments are provided for by the present invention, the scope of which is defined by the following claims.

What is claimed is:
1. A computer-implemented method comprising:
   executing workloads in respective containers by using hardware resources allocated to those containers;
   preparing a reallocation plan for reallocating said hardware resources amongst said containers, said reallocation plan requiring transfer of at least some hardware resource units, said reallocation plan being based at least in part on workload priorities pre-assigned to said workloads prior to said preparing, said preparing involving explicitly assigning resource-unit priorities to resource units requiring transfer to implement said reallocation so as to differentiate least-needed resource units from most-needed resource units;

preparing a transfer sequence plan for implementing said reallocation plan, said transfer sequence plan specifying an order in which said resource units requiring transfer are to be transferred so that delays associated with transfers of said least-needed resource units are longer than delays associated with transfers of said most-needed resource units, said order being based at least in part on said resource-unit priorities; and after preparing said transfer sequence plan, implementing said reallocation plan by implementing said transfer sequence plan.

2. A method as recited in claim 1 wherein said resource-unit priorities are assigned according to the relative benefit of accomplishing or relative cost of delaying or both a transfer of each said unit according to its assignment for said reallocation.

3. A method as recited in claim 1 wherein said resource-unit priorities are derived, at least in part, from said workload priorities.

4. A method as recited in claim 1 wherein said preparing a transfer sequence plan involves selecting source containers for resource units are to be transferred to respective destination containers.

5. A system comprising non-transitory computer-readable media encoded with code configured to, when executed by a processor:

plan a reallocation of computing resources to resource containers in which workloads are executing, said reallocation requiring transfer of at least some computing resource units, said planning being based at least in part on workload priorities pre-assigned to said workloads prior to said planning, the planning involving explicitly assigning resource-unit priorities to resource units requiring transfer to implement said reallocation so as to differentiate least-needed units from most-needed units;

plan a transfer sequence for implementing said reallocation, said transfer sequence having an order in which said resource units requiring transfer are to be transferred so that delays associated with transfers of said least-needed resource units are longer than delays associated with transfers of said most-needed resource units, said order being based at least in part on said resource-unit priorities; and after said transfer sequence is planned, implement said reallocation by implementing said transfer sequence.

6. A system as recited in claim 5 further comprising said processor.

7. A system as recited in claim 5 wherein said code is configured to assign resource-unit priorities according to the relative benefit of accomplishing or relative cost of delaying or both a transfer of each said unit according to its assignment for said reallocation.

8. A system as recited in claim 5 wherein said code is configured to assign resource-unit priorities based at least in part on said workload priorities.

9. A method as recited in claim 5 wherein said preparing a transfer sequence plan involves selecting source containers for resource units to be transferred to respective destination containers.

* * * * *

UNITED STATES PATENT AND TRADEMARK OFFICE
CERTIFICATE OF CORRECTION

PATENT NO.         : 9,081,627 B1
APPLICATION NO.    : 11/831657
DATED              : July 14, 2015
INVENTOR(S)        : William H. Blanding et al.

Page 1 of 1

It is certified that error appears in the above-identified patent and that said Letters Patent is hereby corrected as shown below:

Claims

In column 10, line 29 approx., in Claim 9, delete "method" and insert -- system --, therefor.

Signed and Sealed this
Twelfth Day of January, 2016

Michelle K. Lee
*Director of the United States Patent and Trademark Office*